(12) United States Patent
McCubbins, Jr. et al.

(10) Patent No.: US 9,145,511 B2
(45) Date of Patent: Sep. 29, 2015

(54) METALLIC NANOPARTICLE BIOCIDE IN INDUSTRIAL APPLICATIONS

(75) Inventors: Ray Woodrow McCubbins, Jr., Eagle Mountain, UT (US); Nathan Jared Whiting, Highland, UT (US); Fred Vincent Schillreff, Myton, UT (US); Larry George Miller, Pleasant Grove, UT (US); Theron Glade Miller, Park City, UT (US)

(73) Assignee: Pure Liquid Solutions, LLC, Eagle Mountain, UT (US)

( * ) Notice: Subject to any disclaimer, the term of this patent is extended or adjusted under 35 U.S.C. 154(b) by 530 days.

(21) Appl. No.: 13/368,252

(22) Filed: Feb. 7, 2012

(65) Prior Publication Data
US 2012/0190598 A1     Jul. 26, 2012

Related U.S. Application Data

(60) Provisional application No. 61/446,599, filed on Feb. 25, 2011.

(51) Int. Cl.
    *C23F 11/18*       (2006.01)
    *C09K 8/66*        (2006.01)
    (Continued)

(52) U.S. Cl.
CPC ............. *C09K 8/665* (2013.01); *B82Y 30/00* (2013.01); *C09K 8/032* (2013.01); *C09K 8/528* (2013.01); *C09K 8/536* (2013.01); *C09K 8/54* (2013.01); *C09K 2208/10* (2013.01); *C09K 2208/20* (2013.01); *C09K 2208/32* (2013.01)

(58) Field of Classification Search
CPC ...... C09K 8/605; C09K 8/05; C09K 2208/10; C09K 2208/20; C09K 2208/32; Y10S 507/906; Y10S 507/934; Y10S 507/939
USPC .................. 507/270, 920; 977/773, 902, 903
See application file for complete search history.

(56) References Cited

U.S. PATENT DOCUMENTS 3,118,500 A    1/1964    Maddox et al.
7,833,945 B2   11/2010   Harrower et al.
(Continued)

FOREIGN PATENT DOCUMENTS

WO    2009055200 A2    4/2009

OTHER PUBLICATIONS

Djokic, et.al.,"Behavior of Silver in Physiological Solutions", J. Electrochem. Soc., 1998, vol. 145, Issue 5, pp. 1426-1430.*
Zimpfer "European Search Report" Application No. 12749303, European Patent Office, 8 pages, mailed Nov. 13, 2014.
Moon "International Preliminary Report on Patentability"for Application No. PCT/US2013/072393, mailed Jun. 2, 2015, 7 pages.

*Primary Examiner* — Aiqun Li
(74) *Attorney, Agent, or Firm* — Jeffrey T. Holman (57) ABSTRACT

A method includes providing and adding a measured dose amount of manufactured metallic nanoparticle material to a carrier material for pre-treatment of the carrier material prior to use of the carrier material and the manufactured metallic nanoparticle material in the sub-surface earth activity. Another method includes accessing a sub-surface earth opening used with a sub-surface earth activity, introducing an amount of manufactured metallic nanoparticle material into the sub-surface earth opening, and treating a sub-surface earth condition present at a sub-surface earth location accessible via the sub-surface earth opening. The sub-surface earth condition is treated with the manufactured metallic nanoparticle material. Another method includes accessing a product from a sub-surface earth location that is extracted in conjunction with the sub-surface earth activity, measuring and introducing a dose amount of manufactured metallic nanoparticle material with the product from the sub-surface earth location.

20 Claims, 5 Drawing Sheets

(51) Int. Cl.
    *C09K 8/03*     (2006.01)
    *C09K 8/528*     (2006.01)
    *C09K 8/536*     (2006.01)
    *C09K 8/54*     (2006.01)
    *B82Y 30/00*     (2011.01)

(56) References Cited

U.S. PATENT DOCUMENTS

2008/0119375 A1*   5/2008   Barmatov et al. ............ 507/270
2012/0015852 A1    1/2012   Quintero et al.

* cited by examiner

METALLIC NANOPARTICLE BIOCIDE IN INDUSTRIAL APPLICATIONS

CROSS-REFERENCE TO RELATED APPLICATIONS

This application claims the benefit of priority of U.S. Provisional Patent Application 61/446,599, filed on Feb. 25, 2011, and entitled "Metallic Nanoparticle Biocide in Industrial Applications" which is incorporated in its entirety herein.

BACKGROUND

Many industrial processes benefit from the use of biocides to reduce corrosion or otherwise aid the process. Microorganisms are one common cause of corrosion. Sulfate-reducing bacteria ("SRB"), for example, oxidize organic compounds found in many drilling fluids and reduce sulfates to sulfides, in particular, hydrogen sulfide ($H_2S$) and hydrosulfide ions ($HS^-$). Boreholes, or deep subterranean holes drilled into the earth, often expose anaerobic conditions which promulgate SRB and other potentially harmful microorganisms.

Since bacteria are the ultimate cause of one major source of corrosion, biocides are often included with conventional drilling fluid and in source water. These biocides are intended to kill or reduce the bacteria, $H_2S$, organic carbons, and metals that often prevent successful outcomes in geotechnical engineering boreholes. Examples of biocides used in drilling fluid include chlorine, glutaraldehyde, sodium hydroxide, and sodium hypochlorite. However, conventional biocides used in drilling and other industrial processes have significant drawbacks. Typical biocides are dangerously toxic and/or are relatively expensive to use in adequate volumes. Many biocides break down or dissipate quickly and, therefore, must regularly be replaced, which leads to increasing costs. Also, some biocides require relatively high concentrations to be effective, which can have detrimental effects on the surrounding ecosystem or to well workers or other personnel. One drawback that has drawn particular concern in recent years is toxicity of biocides. Toxic biocides may be leaching from well bores into aquifers or other unintended locations. The potential environmental drawbacks of using these biocides in drilling fluids may result in further regulation and increased cost in the future. Disposing of drilling fluids that contain these toxic biocides results in significant costs and concerns. Additionally, the high concentrations of conventional treatment materials may contribute to the corrosion of casings, pumps, pipelines and other engineered materials. Also, recovered drilling fluids or produced water may contain elevated concentrations of various toxic chemicals, metals, and hydrogen sulfide, and other gases.

SUMMARY

Various embodiments of methods, systems, and compositions are described herein. In some embodiments, the methods include using a metallic nanoparticle material in conjunction with industrial activities. In more specific embodiments, the methods include using a metallic nanoparticle material in conjunction with sub-surface earth activity.

In one embodiment, the method includes providing a measured dose amount of manufactured metallic nanoparticle material and adding the measured dose amount of the manufactured metallic nanoparticle material to a carrier material for pre-treatment of the carrier material prior to use of the carrier material and the manufactured metallic nanoparticle material in the sub-surface earth activity. In another embodiment, the method includes accessing a sub-surface earth opening that is used in conjunction with the sub-surface earth activity, introducing an amount of manufactured metallic nanoparticle material into the sub-surface earth opening, and treating a sub-surface earth condition present at a sub-surface earth location accessible via the sub-surface earth opening. The sub-surface earth condition is treated with the manufactured metallic nanoparticle material. In another embodiment, the method includes accessing a product from a sub-surface earth location that is extracted in conjunction with the sub-surface earth activity, measuring a dose amount of manufactured metallic nanoparticle material, introducing the measured dose amount of the manufactured metallic nanoparticle material with the product from the sub-surface earth location.

References herein to measuring or a measurement are generally understood to include separating an amount from a larger amount. The separated amount may be a precise and predetermined amount (e.g., obtained with a volume- or weight-based measuring tool) or, alternatively, may be a more imprecise and undetermined amount (e.g., obtained by pouring some random or roughly estimated amount from a container).

In embodiments of each of these methods, additional operations may be performed and/or parameters may be specified. In some embodiments, the method also includes using the carrier material and the manufactured metallic nanoparticle material in the sub-surface earth activity to chemically decompose a majority or substantially all of the hydrogen sulfide ($H_2S$) and/or the hydrosulfide ions ($HS^-$) exposed to the carrier material and the manufactured metallic nanoparticle material. In some embodiments, the method also includes using the carrier material and the manufactured metallic nanoparticle material in the sub-surface earth activity to decrease a source of corrosion within the sub-surface earth activity. In some embodiments, the method also includes using the carrier material and the manufactured metallic nanoparticle material in the sub-surface earth activity to treat both a liquid and a gas within the sub-surface earth activity. In some embodiments, the manufactured metallic nanoparticle material includes silver nanoparticles, and substantially all of the silver nanoparticles have a diameter between about 2 nanometers and about 100 nanometers and/or an average diameter between about 5 nanometers and about 15 nanometers.

Other embodiments of methods, systems, and compositions are also described.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments incorporate metallic nanoparticle compositions, in isolation or as part of a solution or other combination, as a biocide into an industrial application. In some embodiments, the metallic nanoparticle composition includes metallic silver nanoparticles permanently bonded to structured water that utilize multiple modes of biocidal action to destroy bacteria (e.g., pathogens) catalytically or synergistically (i.e., using multiple modes of toxicity), without using up the embodied modes of action.

Many industrial processes benefit from the use of biocides to reduce corrosion or otherwise aid the process. Typical biocides, however, are dangerously toxic and/or are relatively expensive to use in adequate volumes. In contrast, metallic nanoparticle compositions may have excellent biocidal characteristics while being relatively long-lasting and non-toxic. Incorporation of metallic nanoparticle compositions into industrial processes may result in favorable biocidal outcomes while reducing environmental risks and costs.

Many industrial processes involve the drilling, or boring, of deep, subterranean holes into the earth. These holes are often referred to as boreholes. For example, in the oil and gas industry, holes more than a mile deep are often bored beneath the ground. This drilling process generally includes pumping various types of fluid that provide cooling for a drill bit, remove particles cut by the drill bit, and, in some cases, provide power to the drill bit. Fluid is also pumped into the borehole for other reasons, such as supporting the walls of the borehole and to stimulate production of the well. These fluids are commonly referred to as "drilling fluid," "drilling mud," "completion fluid," "work-over fluid," "packer fluid," "fracturing fluid," "stimulation fluid," "conformance control fluid," "permeability control fluid," "consolidation fluid," and so forth. As used herein, "drilling fluid" may refer to any type of fluid pumped into a borehole during drilling, production, maintenance, or restoration processes. In some embodiments, the drilling fluid is water, which may or may not contain additional chemical substances.

Water is the most common constituent in these fluids and used throughout industrial processes, including sub-surface processes related to applied geotechnical engineering. Applied geotechnical engineering activities and processes may include any sub-surface drilling activities, surface excavation activities, or similar activities related to any purpose including, but not limited to, oil and gas and geothermal industrial operations. The natural properties of water as a carrier can both assist and impede certain processes. At various stages of, for example, the applied science of boring holes in the earth, water absorbs and/or carries large amounts of particles and elements from the earth as well as compositions of chemicals added to the water. Biocides are one example of chemicals that are conventionally added to water, at various concentrations, to address issues related to bacteria, organic carbons, metals, sulfides, and so forth that occur in subterranean geologic formations.

The term drilling fluid, as used herein, refers to any fluid used to drill boreholes into the earth. Bacteria, organic carbons, and metals and sulfides interfere with drilling fluid functions. Typical drilling fluid functions include, but are not limited to the following:

Removing cuttings from wells and boreholes
Suspending and releasing cuttings
Controlling formation pressures
Sealing permeable formations
Maintaining wellbore stability
Minimizing formation damage
Cooling, lubricating, and supporting the bit and drilling assembly
Transmitting hydraulic energy to tools and bit
Ensuring adequate formation evaluation
Controlling corrosion (in acceptable levels)
Facilitating cementing and completion
Minimizing impact on the environment The various components of the drilling system are typically submerged in the drilling fluid and frequently fail due to corrosion. This corrosion is often caused by corrosive agents that travel through the drilling fluid to the components of the drilling system. These failures can result in significant danger to workers operating the drilling system and cause expensive delays as replacement parts are put in place.

Microorganisms are one common cause of corrosion. Sulfate-reducing bacteria ("SRB"), for example, oxidize organic compounds found in many drilling fluids and reduce sulfates to sulfides, in particular, hydrogen sulfide ($H_2S$) and hydrosulfide ions ($HS^-$). When metal drilling equipment is used in the presence of SRB, the result is often corrosion of the metal equipment due to $H_2S$ produced by SRB, a condition which may greatly impede or prevent the production from an entire well field, commonly referred to as a "sour gas" field. Hydrogen sulfide can also be dangerous in other ways under normal operating conditions.

Further, even after the drilling process is complete, other equipment and/or structures installed in the boreholes can suffer corrosive effects of the SRB. For example, concrete and metal pipes may corrode over time and ultimately fail within the borehole. Additionally, the installation processes themselves can be hindered or compromised due to the SRB. For example, SRB can prevent concrete from properly curing, which may result in a catastrophic failure of a borehole.

Since bacteria are the ultimate cause of one major source of corrosion, biocides are often included with conventional drilling fluid and in source water. These biocides are intended to kill or reduce the bacteria, $H_2S$, organic carbons, and metals that often prevent successful outcomes in geotechnical engineering boreholes. Examples of biocides used in drilling fluid include chlorine, glutaraldehyde, sodium hydroxide, and sodium hypochlorite. However, conventional biocides used in drilling and other industrial processes have significant drawbacks. Many break down or dissipate quickly and, therefore, must regularly be replaced, which leads to increasing costs. Also, some biocides require relatively high concentrations to be effective, which can impart their own corrosive action and, hence, conflict with the goal of eliminating bacterial-produced corrosive agents such as hydrogen sulfide. Also, the use of some biocides in this manner can have detrimental effects on the surrounding ecosystem or to well workers or other personnel. One drawback that has drawn particular concern in recent years is toxicity of biocides. Toxic biocides may be leaching from well bores into aquifers or other unintended locations. The potential environmental drawbacks of using these biocides in drilling fluids may result in further regulation and increased cost in the future. Disposing of drilling fluids that contain these toxic biocides results in significant costs and concerns.

As a result, drilling companies are in need of a biocide that has lower human and environmental toxicity, does not break down quickly, and is effective against SRB and $H_2S$. One biocide described in this disclosure that has these characteristics is of a metallic nanoparticle composition. One example of a metallic nanoparticle composition is described in U.S. Pat. No. 7,135,195, issued to Robert J. Holladay, et al. on Nov. 14, 2006, which is incorporated by reference in its entirety into this application.

Figure 1:
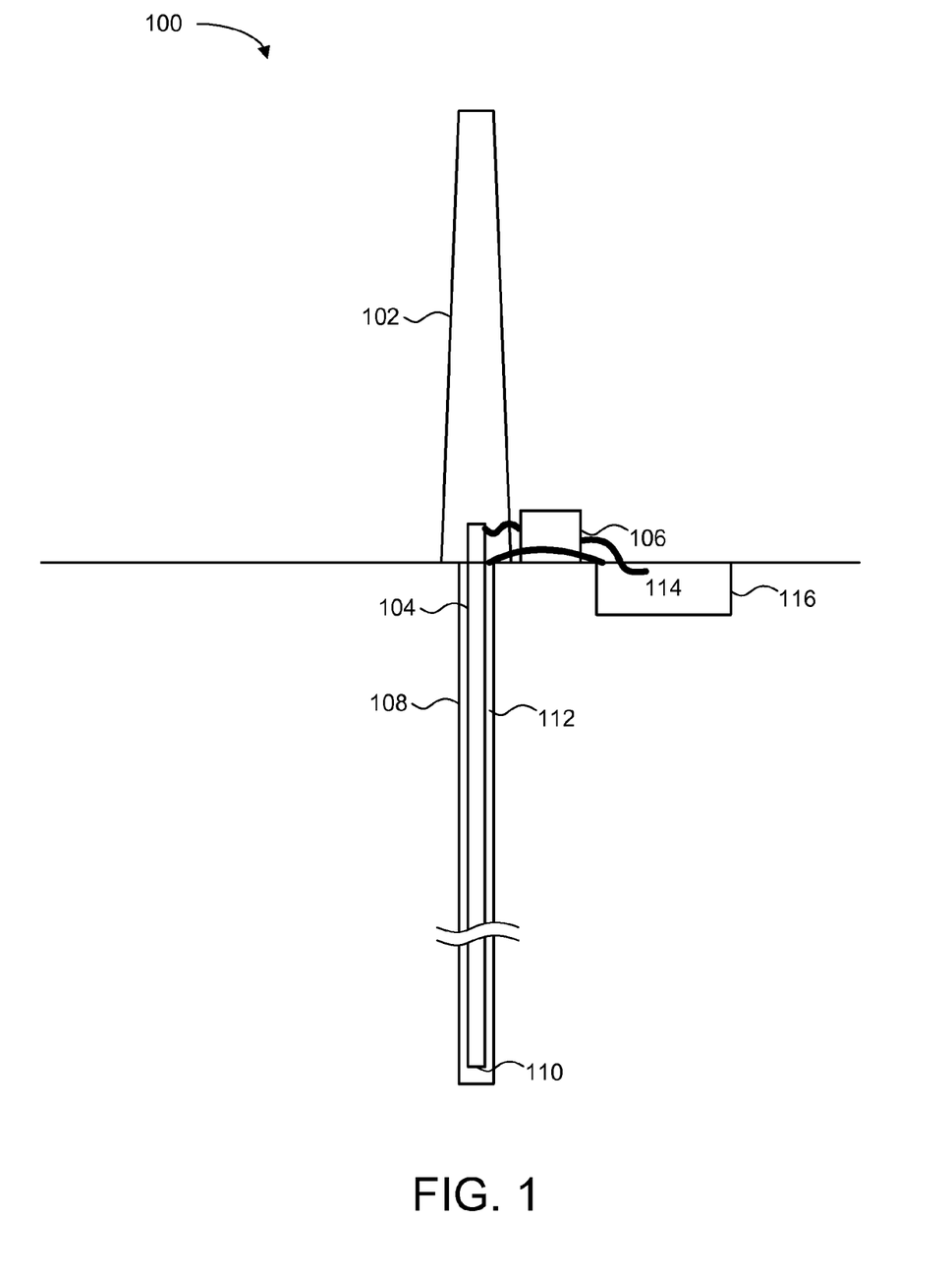
FIG. 1 depicts a diagram of one embodiment of a system for drilling a well using drilling fluid.

FIG. 1 depicts a diagram of one embodiment of a system 100 for drilling a well using drilling fluid. The system 100 includes a derrick 102, a drill string 104, and a mud pump 106. The system 100 drills a borehole 108 into the ground.

The derrick 102, in some embodiments, is a support structure for supporting other elements of the system 100. The derrick 102 includes machinery for lifting and positioning the drill string 104 and may also include other machinery to operate the system 100 and perform functions of the system 100, such as turning a drill bit 110 in the borehole 108. The derrick 102 may be any size and include any material capable of supporting the drill string 104.

The drill string 104, in one embodiment, includes one or more sections of hollow drill pipe connected together. The drill string 104 transmits drilling fluid 114 and torque from the surface to the bottom of the drill string 104. The hollow pipe of the drill string 104 acts as a conduit through which drilling fluid 114 flows. The drill string 104 may also include the drill bit 110, which breaks apart, cuts, or crushes rock formations in the path of the borehole.

In some embodiments, the mud pump 106 pumps drilling fluid 114 from the surface, through the drill string 104, to the bottom of the borehole 108. The mud pump 106 may be a reciprocating pump or other device capable of producing high pressure in the drilling fluid 114. The mud pump 106 may include a plurality of pistons/plungers to pump the drilling fluid 114, and may be sized relative to the size and depth of the borehole 108. The mud pump 106 may further include one or more dampeners to reduce vibration.

The drilling fluid 114 is pumped by the mud pump 106 through the hollow drill string 104 to the drill bit 110 at the bottom of the borehole 108. The drilling fluid 114 then flows upward in the annular space between the drill string 104 and the wall of the borehole 108, known as the annulus 112. The drilling fluid 114 exits the top of the annulus 112 and be recirculated through the mud pump 106, the drill string 104, the drill bit 110, and the annulus 112.

The drilling fluid 114 performs several functions. In some embodiments, the drilling fluid 114 lubricates and cools the drill bit 110 to prolong the use of the drill bit 110. The drilling fluid 114 also removes the material, known as "cuttings," cut by the drill bit 110 from the borehole 108. In some embodiments, the drilling fluid 114 provides power to the drill bit 110 or other components of the drill string 104. The drilling fluid 114 may also include a biocide to reduce bacterial production, for example, of corrosive substances.

In one embodiment, the drilling fluid 114 includes a metallic nanoparticle composition. The metallic nanoparticle composition may reduce the activity of or kill at least a portion of SRB in the drilling fluid 114. As a result, production of corrosive material in the drilling fluid 114 may be reduced. In a specific embodiment, the metallic nanoparticles include silver nanoparticles. Although the following description refers to silver nanoparticles, the description provided may be applicable to nanoparticles that are formed by, or include, other metals or metallic characteristics. The silver nanoparticles may be present in the drilling fluid 114 in any number of concentration levels. As one example, the silver nanoparticles may be present in the drilling fluid 114 in a concentration of between about fifty parts per billion and five parts per million. In another example, the silver nanoparticles may be present in the drilling fluid 114 in a concentration of up to about 100 parts per million. In another example, the silver nanoparticles may be present in the drilling fluid 114 in a concentration of down to about one part per billion. The concentration level used within a particular application may depend on the type of industrial application for which the silver nanoparticle composition is used. Additionally, other concentration ranges may be applicable for nanoparticles which include metals other than silver.

In some embodiments, the drilling fluid 114 is allowed to settle in a mud pit 116 before recirculation to allow cuttings to settle out of the drilling fluid 114. The drilling fluid 114 also may be monitored or modified before being recirculated. For conventional biocide additives, this settling process may result in settling of the biocide along with the cuttings, chemical transformation and degradation, or volatilization to the atmosphere. The concentration of the biocide in the drilling fluid 114 may, therefore, be reduced, along with efficacy. In addition, conventional biocides may be degraded or consumed relatively quickly while in use, thus requiring addition of more biocide to the drilling fluid 114 over a relatively short time.

In some embodiments, silver nanoparticle compositions have physical characteristics that cause them to remain in suspension while the drilling fluid 114 rests in the mud pit 116. The small size of the nanoparticles, in conjunction with the structure of the nanoparticles and various fundamental forces, may cause the nanoparticles to remain suspended and, consequently, not settle in the mud pit 116, or to settle relatively slowly and to retain its biocidal properties. As a result, a biocide including a silver nanoparticle composition or a solution which includes essentially only the silver nanoparticle material may maintain concentration and efficacy longer than other existing biocides.

The silver nanoparticles may be stable in the composition without surfactants. Therefore, the drilling fluid 114 may be free of surfactants. However, other embodiments may include surfactants.

The silver nanoparticle composition, in some embodiments, retains efficacy as a biocide longer and neutralizes more SRB than other conventional biocides used in drilling and other industrial applications. Efficacy may be aided by motion of the nanoparticles that may be caused by physical characteristics of the nanoparticles. The relatively small nanoparticles (relative to, for example, microparticles) may exhibit relatively high levels of Brownian motion. In some embodiments, the metallic nanoparticle composition includes metallic silver nanoparticles that are permanently, essentially permanently, or semi-permanently bonded to structured water that utilize multiple modes of biocidal action to destroy bacteria (e.g., pathogens) catalytically or synergistically (i.e., using multiple modes of toxicity), without using up the embodied modes of action. Consequently, the silver nanoparticle compositions may retain their efficacy as a biocide longer than larger particles.

In certain embodiments, the biocidal additives for the drilling fluid 114 include no organic polymers. In other words, the drilling fluid 114 may contain exclusively inorganic biocides. The drilling fluid 114 may contain silver nanoparticles that substantially do not include organic matter. In one embodiment, the biocidal additives for the drilling fluid 114 may be primarily or exclusively a suspension of silver nanoparticles in water. In another embodiment, the biocidal additives for the drilling fluid 114 may be a suspension of silver nanoparticles in water combined with one or more additional substances. Embodiments of the silver nanoparticles are discussed in greater detail below in relation to FIG. 4.

In certain embodiments, the biocidal additives for the drilling fluid 114 also may include hydrogen peroxide ($H_2O_2$). The hydrogen peroxide may interact with the silver nanoparticles to enhance antimicrobial activity of the drilling fluid 114. In particular, the addition of hydrogen peroxide can counteract some or all of the effects of high salinity, which otherwise might negatively affect the effectiveness of a silver nanoparticle solution. In this way, it may be said that the hydrogen peroxide at least partially neutralizes the salinity. In some embodiments, the hydrogen peroxide acts as a biocide for anaerobic microbes. The hydrogen peroxide may constitute approximately 0.5% to 5.0% of the overall solution. Other embodiments may include more or less hydrogen peroxide. Other embodiments may be confined to a more narrow percentage range of the overall solution (e.g., between about 1.0-4.0%, between about 2.0-3.0%, etc.). As one example, the hydrogen peroxide may be present in the drilling fluid 114 in a concentration of between about 500 parts per billion and about 10 parts per million. In another example, the hydrogen peroxide may be present in the drilling fluid 114 in a concentration of up to about 100 parts per million. In some embodiments, hydrogen peroxide is present together with the silver nanoparticle in the drilling fluid 114. This embodiment may utilize a range of silver nanoparticle concentrations, as explained above, and hydrogen peroxide concentrations in the range of about 500 parts per billion to about 100 parts per million.

Figure 2:
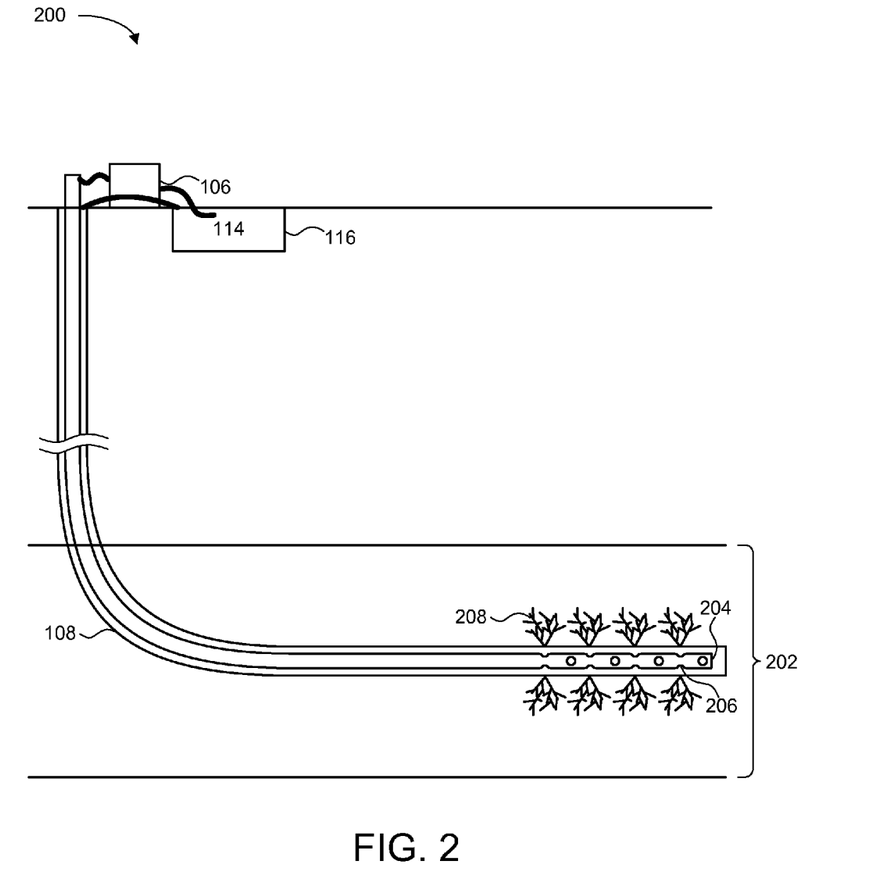
FIG. 2 shows one embodiment of a system for hydraulic fracturing to stimulate oil and gas production.

FIG. 2 shows one embodiment of a system 200 for hydraulic fracturing to stimulate oil and gas production. The system 200 includes a mud pump 106, drilling fluid 114, and a perforating gun 204. The system fractures rock around a portion of the borehole 108 to facilitate production of the well.

The perforating gun 204, in one embodiment, is inserted into a lateral section of the borehole 108 ("the lateral"). The lateral may be located within a particular layer 202 of rock or a rock formation, such as a shale layer. The perforating gun 204 applies pressure to a casing and other surrounding structures lining the borehole 108, such as a concrete lining and rock surrounding the borehole 108. The applied pressure is located at particular perforation sites 206 that focus the pressure in a location such that the casing, concrete lining, and rock are perforated at or near the perforation sites 206. The perforating gun 204 uses any method of applying pressure, such as a shaped charge or other explosive.

The perforating gun 204 is then removed from the borehole 108, and the borehole is filled with a fracturing fluid. The fracturing fluid may be similar, in some aspects, to the drilling fluid 114 used in drilling the borehole 108 or may be a specialized fracturing fluid which includes similar silver nanoparticle solution, as described above. The fracturing fluid is placed under pressure in the borehole 108 by the mud pump 106 or another pump or pressure generating device. The mud pump 106 may be the same pump used in the drilling process or may be a specialized fracturing pump.

The pressure of the fracturing fluid fractures rock near the perforations. The fractures 208 created by the pressurized fracturing fluid may extend into the layer 202 of rock around the borehole 108. In general, the fractures 208 provide a low-resistance pathway for oil, gas, or other substances to enter the borehole and be removed from the well.

Hydraulic fracturing is commonly used to stimulate production of wells, but the fracturing process includes several difficulties. Similar to the drilling fluid mentioned above, the fracturing fluid may be negatively affected by the presence of bacteria such as SRB. Corrosion due to SRB is a regular problem in typical fracturing systems. Consequently, biocides are frequently included in the fracturing fluid used in the fracturing process to mitigate the effects of SRB. In conventional systems, the fracturing fluid may include toxic components, including a toxic biocide. The toxicity of conventional fracturing fluids used in existing systems may result in danger to workers, the surrounding environment, aquifers, and people living nearby. Perceived danger from fracturing fluid used in fracturing may result in increased governmental regulation that will require the use of less toxic materials in the process.

In some embodiments described herein, the fracturing fluid used in the fracturing process includes silver nanoparticles in a structured water suspension. The silver nanoparticles may include the properties and characteristics described herein in relation to FIG. 1 and elsewhere. In one embodiment, the silver nanoparticles are suspended in water which is added to the fracturing fluid. The silver nanoparticle suspension may act as an effective biocide with relatively low concentrations when compared to other biocides as described herein above. In some embodiments, the silver nanoparticle suspension will be present in concentrations in the ranges described previously. In some embodiments, the silver nanoparticle suspension will be present in the fracturing fluid together with hydrogen peroxide in the concentration ranges described previously.

In addition to the drilling and fracturing processes described above, a silver nanoparticle suspension may be used in other industrial applications. For example, a silver nanoparticle suspension may be used as a biocide in a similar manner in several other drilling processes, including but not limited to water injection to stimulate well production, reclamation of drilling fluid water, well servicing, and sour gas mitigation. Silver nanoparticle suspensions may be used as a biocide in a similar manner in other industrial applications, including, but not limited to, the following: fluid optimization; water disinfection; water purification; water treatment; water separation; produced water recovery and treatment; well conditioning; drilling fluid conditioner; drilling fluid mineral; drilling fluid friction reducer; cement conditioner; surface flood irrigation; mechanical vapor enhancement; contamination counteractive; rehabilitation/reclamation curative; reservoir/formation conditioner; aquifer restoration; soil remediation; scale inhibitor; bacteria elimination; pathogen elimination; drilling process enhancement; oil and water separation; fluid integration; casing protection; bacteria prevention; ultraviolet property similarities; arsenic elimination; petroleum refining process; land surface discharge; non-point source discharge; evaporation pond treatment and discharge control; wetland treatment; dust control; field wash; potable/non-potable water; iron removal; underground injection; enhanced evaporation; water balancing; hydrogen sulfide elimination (sulfur reducing bacteria), and other similar applications.

Other industrial applications in which silver nanoparticle suspensions may be used include, but are not limited to, the following: surfactant; ion exchange; electrodialysis (ED); electrodialysis reversal (EDR); capacitive deionization technology; electrochemical activation technology; electrodeionization; plant/vegetation nutrient; electromagnetic semiconductors. Silver nanoparticle solutions also may be used in processes of reduction in chloride and sulfide ($H_2S$ and $HS^-$), nitrate, nitrite, and/or other ion concentrations. Silver nanoparticle solutions also may be used in processes of reduction in selenium, arsenic, copper and/or other metal concentrations. Silver nanoparticle solutions also may be used in processes of reduction in polynuclear aromatic hydrocarbons and other organic compounds.

Appendix A includes Inorganic Analytical Reports for test data from tests that were performed on 4 samples by a certified analytical laboratory. In these or similar test data, the abbreviation "Surr" found in organic reports indicates a surrogate compound that is intentionally added by the laboratory to determine sample injection, extraction, and/or purging efficiency. The "Reporting Limit" found on the report is equivalent to the practical quantitation limit (PQL), which is the minimum concentration that can be reported by the method referenced and the sample matrix. The reporting limit is not necessarily related to any regulatory limit and, in some cases, may preclude more accurate test data that might be obtained using more precise testing equipment. Within these constraints, analytical results are reported to three significant figures for quality control and calculation purposes. Also, for the sulfide analysis performed and reported in Appendix A, there was a limited volume of sample provided so the sample was diluted to achieve a particular volume for sample analysis. This dilution results in raising the reporting limit of that sample. Sample 5 shown in Appendix A includes results of treating flow-back water mixed with production water during the transition between well completion and oil production in a well field in southern Wyoming.

Other analyses, also using ASTM Standard Methods, demonstrate the ability of the silver nanoparticle solution to reduce sulfide concentrations. Results of these Sulfide Chemical Oxidation Tests are also included in Appendix A.

Potential users of embodiments of the metallic nanotechnology described herein, or equivalent metallic nanotechnology, include, but are not limited to, entities engaged in some aspect of the oil and gas industry, subterranean geotechnical engineering, as well as other industrial energy or environmental related product applications. Some examples of potential uses include, but are not limited to, the following: national, international, multi-national major oil business, national oil companies, fully integrated oil entities, independent oil companies, refiners, marketers, producers, investors, participants, consumers and speculators, manufacturers and creators for trading futures, distributors and traders in the oil marketplace consisting of the cash market, the forward market and the futures market, as well as all energy service providers, third party providers and any corporations, subsidiaries, divisions, auxiliaries, and holdings or affiliates participating in upstream and downstream activities.

In general, embodiments of the metallic nanotechnology described herein, or equivalent metallic nanotechnology, include, but are not limited to, activities within the general fields of engineering, construction, operations, planning, designing, exploration, and production endeavors. Some examples of potential activities within these fields include, but are not limited to, production, refining, manufacturing, treatment, chemical, petro-chemical, gas to liquids, geothermal, geotechnical, processing, pipelining, fluids, hydrocarbons, organic vapors, transportation, handling, seismic, geological, geophysical, technical, exploitation, engineering, sedimentary, magnetic, gravimetric, transference, conductivity, reservoirs, seabed, meteorological, environmental, mud pits, mud systems, mud fluids, mud products, mud additives, biocide replacements or additives, viscosity enhancement, optimization, recovery methodology, wellbore fluids, cementing fluids, slick-line fluids, hydraulic fracturing fluids, industrial water applications, gas or pressurized fracturing, work over fluids, cementing fluids, bore holes, circulation processes, connate water, formation water, interstitial water, mineral aggregates or organic matter, sulfur reducing bacteria, all other surface and subsurface bacteria known or unknown, produced water, settling pond fluids, reserve pit fluids, closed loop fluids, miscible fluids, water-flooding, water wells, disposal wells, fluid injections, input wells, outpost wells, flow treaters, enhanced recovery, salt water fluids, salt water disposal, hydrogen sulfide, dissolved gasses, carbon dioxides, gas injection, water-flood, tertiary methods employing chemicals, gases, heat, efficiency increases of resource recovery, pumpers, tanks consumables, cleaning, tank batteries, tank farms, tank storage, air drilling, air/gas lifts, swabbing, heater treating, hot oiling, acidizing, pigging, cleaning, casing, tubing's, down-hole servicing, wire line, work over, and similar activities. Additional examples include various activities related to the following: facilities, gathering facilities, water treatment systems, piping systems, pipelines, pump stations, lift stations, transfer stations, storage facilities, waste disposal facilities, accommodations, supply units, drill sites, drilling units, disposal facilities, wellheads, flow lines, injection lines, cathodes, separation processes, artificial lift methodologies, advanced recovery techniques, transport equipment, commissioning/decommissioning, rehabilitation, well abandonment, environmental management, evaporation ponds, desalinate evaporation/settling ponds, produced fluids, water treatment of organics, inorganic, metals or other compositions with tangible or intangible characteristics for reduction, increase stabilization, expansion, evaporation, lubrication, acidity, alkalinity, separation, sterilization, activation, and disposal. Additional examples of other commercial and/or industrial applications activities include, but are not limited to, the following: oil, gas, condensates, flammable and non-flammable gasses, hydrocarbons, distillates, gathering processes, dehydrating, compressing, treating and transporting methods, logging, grading, digging, dirt work, preparation, consumables, perforating, and so forth. Also, embodiments of the metallic nanotechnology described herein may be used in conjunction with ongoing research and development activities. Some examples of such research and development activities include, but are not limited to, the following: land based, offshore, mobile, fixed, self-contained, jack ups, semi-submersibles, drill-ships, water barges, drilling rigs, drill modules, transports, workforce accommodations, petroleum refining, chemical plants, urea plants, water disposal facilities, injection facilities, hydrogen sulfide facilities, and so forth. Furthermore, embodiments of the metallic nanotechnology described herein may be used in conjunction with any activities related to environment and/or safety regulations for subs-surface earth activities which do or may result in emissions or extractions that may be treated by the properties of one or more embodiments of the manufactured metallic nanoparticles described herein, or metallic structures equivalent to one or more of the described embodiments of manufactured metallic nanoparticles.

Figure 3:
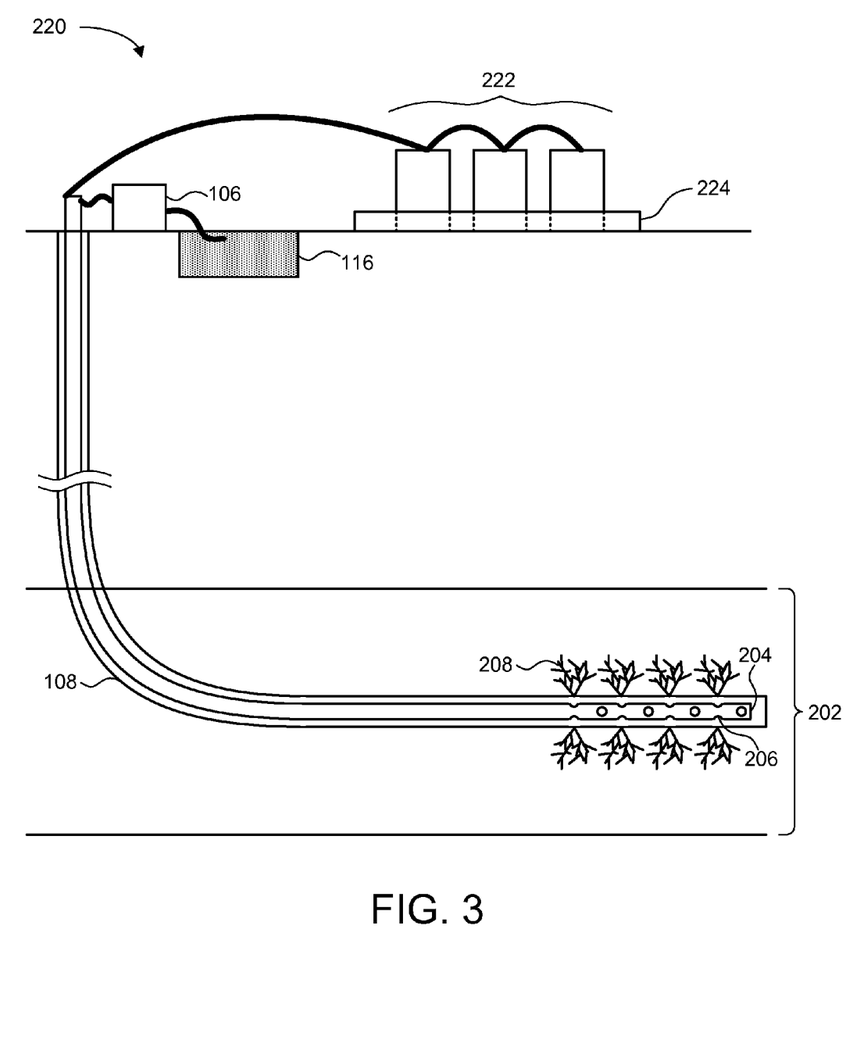
FIG. 3 shows one embodiment of a system for extracting subterranean resources.

FIG. 3 shows one embodiment of a system 220 for extracting subterranean resources. The system 220 of FIG. 3 is substantially similar in many aspects to the system 200 of FIG. 2. However, the system 220 illustrated in FIG. 3 represents an operational stage in which the fracturing is completed and a resource such as natural gas or oil is being extracted from the borehole 108.

In the illustrated system 220, the pit 116 is backfilled because there is no longer a need for drilling fluid 114. The system 220 also includes a tank battery 222 that is installed to store produced water, or water that is extracted from the borehole 108 with the natural gas or other resource(s). The tank battery 222 may include one or more storage tanks that are designed to hold a quantity of produced water. The produced water is stored in tank battery 222 because the produced water potentially has constituents that are harmful to the surface environment. For example, if any toxic chemicals are used in the drilling or fracturing stages, then the produced water may include residual toxic chemical constituents that should not be released to the surface environment. Additionally, some of the natural elements found in the borehole 108 may be dangerous or undesirable in the surface environment. As a secondary precaution, the tank battery 222 may be located within a berm or dike 224. If some of the produced water stored within the tank battery 222 leaks, then the berm or dike 224 is designed to contain the spill for a time while containment and cleanup measures are taken.

Figure 4:
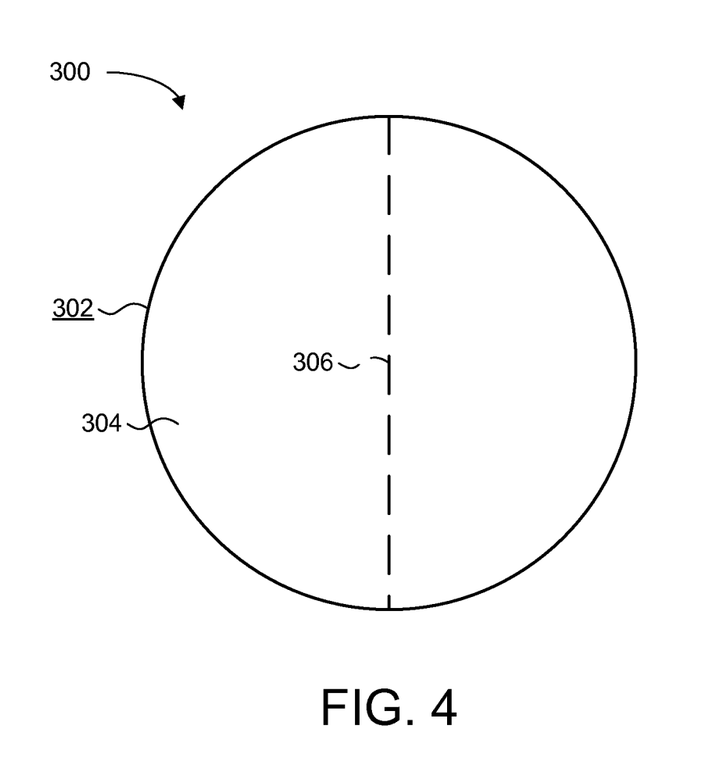
FIG. 4 shows a view of one embodiment of a silver nanoparticle as an example of a metallic nanoparticle.

FIG. 4 shows a view of one embodiment of a silver nanoparticle 300. The silver nanoparticle 300 includes a surface 302 and an interior 304. The silver nanoparticle 300 may be included in a silver nanoparticle suspension.

The surface 302, in one embodiment, is silver oxide. The surface 302 may have a metallic character. In some embodiments, the surface 302 has a covalent character. The interior 304 may be elemental silver.

The silver nanoparticle 300 may have an exact or average diameter 306 that defines a size of the silver nanoparticle 300. In some embodiments, the diameter 306 or size of the silver nanoparticle is between about 0.002 micrometers and about 0.030 micrometers (i.e., 2-30 nanometers). The silver nanoparticles may have variable sizes with an average diameter of about 0.002-0.030 micrometers (i.e., 2-30 nanometers).

The silver nanoparticle 300 may be one of a plurality of silver nanoparticles in a composition. The composition may be a composition of the silver nanoparticles in water. In some embodiments, a majority of the silver nanoparticles in the composition are between about 0.002 micrometers and about 0.030 micrometers in diameter. In another embodiment, at least 75% of the silver nanoparticles in the composition are between about 0.002 micrometers and about 0.030 micrometers in diameter. In a further embodiment, at least 90% of the silver nanoparticles in the composition are between about 0.002 micrometers and about 0.030 micrometers in diameter. In some embodiments, at least 95% of the silver nanoparticles in the composition are between about 0.002 micrometers and about 0.030 micrometers in diameter. In some embodiments of the composition, the silver nanoparticles average 0.0106 micrometers in diameter. As explained above, the silver nanoparticles may exhibit biocidal properties against SRB and/or other bacteria, either within a solution or as a dehydrated substance (e.g., powder).

Figure 5:
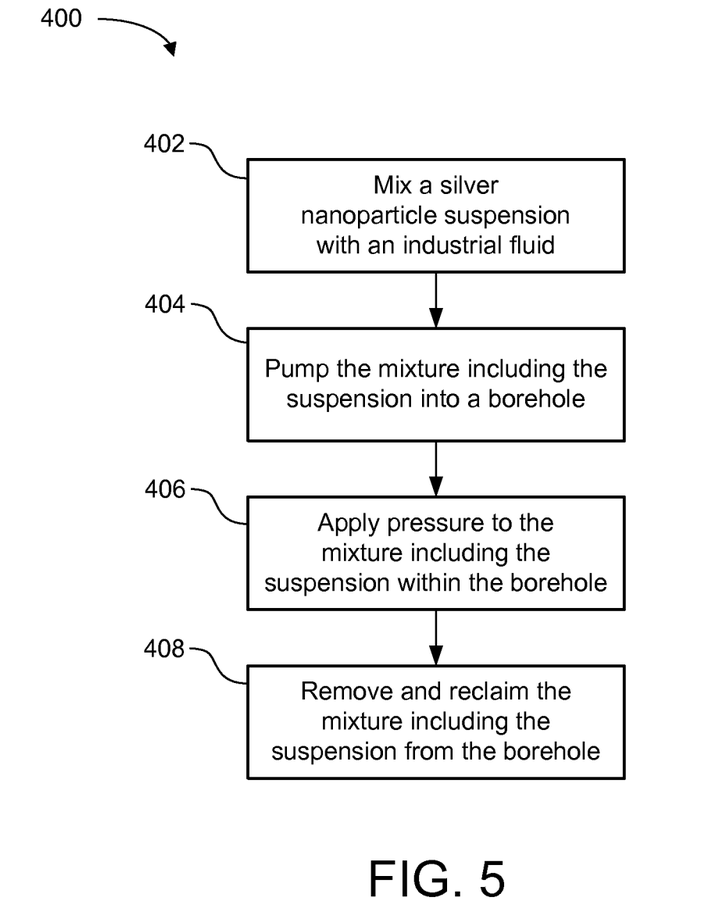
FIG. 5 is a flowchart diagram depicting one embodiment of a method for using a metallic nanoparticle suspension in a drilling application.

FIG. 5 is a flowchart diagram depicting one embodiment of a method 400 for using a silver nanoparticle suspension in a drilling application. The method 400 is in certain embodiments a method of use of the system and apparatus of FIGS. 1-3, and will be discussed with reference to those figures. Nevertheless, the method 400 may also be conducted independently thereof and is not intended to be limited specifically to the specific embodiments discussed above with respect to those figures. Also, although the following description primarily references drilling fluid and equipment, the same or similar operations may be implemented for fracturing fluid and equipment, or for other industrial fluid and associated equipment.

As shown in FIG. 5, a silver nanoparticle suspension is provided 402. The suspension may be in the form of a drilling fluid 114 and may be provided 402 in a mud pit 116 or production water. The suspension may exhibit antimicrobial properties and be usable as a biocide.

A mud pump 106 for drilling mud (or another pump for fracturing fluid) may pump 404 the suspension into a borehole 108. In some embodiments, the suspension is pumped 404 into the borehole 108 through a drill string 104. In another embodiment, the suspension is pumped 404 directly into the borehole 108.

The suspension in the borehole 108 may be pressurized. Pressure may be applied 406 to the suspension by the mud pump 106 or by another device capable of applying pressure. In one embodiment, the applied pressure causes the suspension to circulate through the drill string 104 and back up through an annulus 112 between the borehole wall and the drill string 104. In another embodiment, the suspension is placed under a static pressure, such as in hydraulic fracturing.

In some embodiments, the suspension is removed and reclaimed 408 from the borehole. The suspension may be removed and reclaimed 408 as part of a drilling operation where the suspension flows out of the annulus 112 where it is captured and returned to the mud pit 116 for reuse. In another embodiment, the suspension may be pumped out of the borehole 108 and contained in a vessel (not shown) for future use or disposal.

Embodiments of the disclosure provide reduced human and environmental toxicity and increased safety in a biocide for use in industrial applications. A metallic suspension of silver nanoparticles may be used in place of other biocides or in applications where traditional biocides would be unsafe.

Also, for reference, certain embodiments of the silver nanoparticle solution described herein are distinguishable from other biocidal compositions. As one example, embodiments of the silver nanoparticle solution described herein may be used in a strict form which excludes other potential additives such as conventional toxics, polymers, fillers, coagulants, proppants, surfactants, organic biocides, and so forth. As an example, embodiments of the silver nanoparticle solution described herein may be implemented exclusive of organic constituents that would more readily degrade over time. As another example, embodiments of the silver nanoparticle solution described herein may be implemented which are effectively soluble, or the practical equivalent of a soluble solution. This contrasts with some conventional silver-based biocides which are formed as so-called microparticles or within concoctions of various materials that are relatively unstable within substantially insoluble metallic/particulate matrices. Other embodiments may exhibit other advantages and/or distinguishing features, which will be readily apparent to one skilled in the art in light of the description provided herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for using a metallic nanoparticle material in conjunction with sub-surface earth activity, the method comprising:

providing a measured dose amount of manufactured metallic nanoparticle material, wherein the manufactured metallic nanoparticle comprises an interior comprising elemental metal and a surface comprising a metal oxide of the same elemental metal; and adding the measured dose amount of the manufactured metallic nanoparticle material to a carrier material for pre-treatment of the carrier material prior to use of the carrier material and the manufactured metallic nanoparticle material in the sub-surface earth activity.

2. The method of claim 1, further comprising using the carrier material and the manufactured metallic nanoparticle material in the sub-surface earth activity to chemically decompose a majority of hydrogen sulfide ($H_2S$) and/or hydrosulfide ions ($HS^-$) exposed to the carrier material and the manufactured metallic nanoparticle material.

3. The method of claim 1, further comprising using the carrier material and the manufactured metallic nanoparticle material in the sub-surface earth activity, wherein the manufactured metallic nanoparticle material chemically decomposes substantially all hydrogen sulfide ($H_2S$) and/or hydrosulfide ions ($HS^-$) exposed to the carrier material and the manufactured metallic nanoparticle material.

4. The method of claim 1, further comprising using the carrier material and the manufactured metallic nanoparticle material in the sub-surface earth activity, wherein the manufactured metallic nanoparticle material decreases a source of corrosion within the sub-surface earth activity.

5. The method of claim 1, further comprising using the carrier material and the manufactured metallic nanoparticle material in the sub-surface earth activity, wherein the manufactured metallic nanoparticle material treats both a liquid and a gas within the sub-surface earth activity.

6. The method of claim 1, wherein the manufactured metallic nanoparticle material comprises silver nanoparticles, wherein substantially all of the silver nanoparticles have a diameter between about 2 nanometers and about 100 nanometers.

7. The method of claim 1, wherein the manufactured metallic nanoparticle material comprises silver nanoparticles which have an average diameter between about 5 nanometers and about 15 nanometers.

8. The method of claim 1, further comprising using the carrier material and the manufactured metallic nanoparticle material in the sub-surface earth activity to reduce metal content within the carrier material.

9. A method for using a metallic nanoparticle material in conjunction with sub-surface earth activity, the method comprising:
    accessing a sub-surface earth opening that is used in conjunction with the sub-surface earth activity;
    introducing an amount of manufactured metallic nanoparticle material into the sub-surface earth opening, wherein the manufactured metallic nanoparticle comprises an interior comprising elemental metal and a surface comprising a metal oxide of the same elemental metal; and
    treating, with the manufactured metallic nanoparticle material, a sub-surface earth condition present at a sub-surface earth location accessible via the sub-surface earth opening.

10. The method of claim 9, wherein treating the sub-surface earth condition with the manufactured metallic nanoparticle material further comprises chemically decomposing a majority of hydrogen sulfide ($H_2S$) and/or hydrosulfide ions ($HS^-$) exposed to the manufactured metallic nanoparticle material.

11. The method of claim 9, wherein treating the sub-surface earth condition with the manufactured metallic nanoparticle material further comprises decreasing a source of corrosion within the sub-surface earth activity.

12. The method of claim 9, wherein treating the sub-surface earth condition with the manufactured metallic nanoparticle material further comprises treating both a liquid and a gas within the sub-surface earth activity.

13. The method of claim 9, wherein the manufactured metallic nanoparticle material comprises silver nanoparticles, wherein substantially all of the silver nanoparticles have a diameter between about 2 nanometers and about 100 nanometers.

14. The method of claim 9, wherein the manufactured metallic nanoparticle material comprises silver nanoparticles which have an average diameter between about 5 nanometers and about 15 nanometers.

15. The method of claim 9, wherein the sub-surface earth opening comprises an opening of a borehole, and the sub-surface earth location comprises a location within the borehole.

16. A method for using a metallic nanoparticle material in conjunction with sub-surface earth activity, the method comprising:
    accessing a product from a sub-surface earth location that is extracted in conjunction with the sub-surface earth activity;
    measuring a dose amount of manufactured metallic nanoparticle material, wherein the manufactured metallic nanoparticle comprises an interior comprising elemental metal and a surface comprising a metal oxide of the same elemental metal; and
    introducing the measured dose amount of the manufactured metallic nanoparticle material with the product from the sub-surface earth location.

17. The method of claim 16, further comprising chemically decomposing a majority of hydrogen sulfide ($H_2S$) and/or hydrosulfide ions ($HS^-$) within the product from the sub-surface earth location due to exposure of the hydrogen sulfide ($H_2S$) and/or the hydrosulfide ions ($HS^-$) to the manufactured metallic nanoparticle material.

18. The method of claim 16, further comprising chemically decreasing a source of corrosion within the product from the sub-surface earth location due to exposure of the source of corrosion to the manufactured metallic nanoparticle material.

19. The method of claim 16, further comprising chemically treating both a liquid and a gas associated with the product from the sub-surface earth location due to exposure of the liquid and the gas to the manufactured metallic nanoparticle material.

20. The method of claim 16, wherein the manufactured metallic nanoparticle material comprises silver nanoparticles, wherein substantially all of the silver nanoparticles have a diameter between about 2 nanometers and about 100 nanometers.

* * * * *